United States Patent Office 3,398,214
Patented Aug. 20, 1968

3,398,214
PROCESS FOR PRODUCTION OF POLYMERS OF MONOVINYLAROMATIC COMPOUNDS AND POLYBUTADIENE
Alec N. Roper and Henry G. Scott, Cheshire, England, assignors to Shell Oil Company, New York, N.Y., a corporation of Delaware
No Drawing. Filed Sept. 3, 1965, Ser. No. 485,104
Claims priority, application Great Britain, Sept. 7, 1964, 36,577/64
8 Claims. (Cl. 260—876)

ABSTRACT OF THE DISCLOSURE

A process for the preparation of interpolymers having good surface gloss and high impact strength which comprises: (a) polymerizing a monovinylaromatic compound such as styrene to a conversion not greater than 45% by heating said compound at a temperature between 70° and 140° C., (b) blending the solution of partially polymerized monovinylaromatic compound with a prepolymer to yield a blend containing between 40 and 60% by weight of the prepolymer, and (c) completing polymerization by heating the blend at a temperature between 100° and 220° C., said prepolymer being obtained by polymerizing to a conversion not greater than 10% an agitated mixture of a monovinylaromatic compound and a polybutadiene rubber held at a temperature between 70° and 140° C.

---

This invention relates to polymers of monovinylaromatic compounds and their preparation and in particular to interpolymers of styrene and unsaturated rubbers, and to the preparation of said interpolymers.

Interpolymers of monovinylaromatic compounds and styrene-butadiene rubbers can be prepared by a two stage process, for example, by partially polymerizing a mixture of the monovinylaromatic compound and the styrene-butadiene rubber to a conversion of about 20 to 25% at a temperature of about 90 to about 120° C. and then completing the polymerization at a higher temperature. However, the properties of such interpolymers, for example, surface gloss, limit their use in certain applications, for example, in the extrusion of sheets of polymer. Interpolymers of monovinylaromatic compounds and polybutadiene have a better surface gloss than interpolymers of monovinylaromatic compounds and styrene-butadiene rubbers but they have lower impact strengths when made under identical process conditions.

It has now been found that interpolymers of monovinylaromatic compounds and polybutadiene rubbers with a good surface gloss and a high impact strength can be prepared by blending a solution of a partially polymerized monovinylaromatic compound in the monovinylaromatic compound with a prepolymer obtained by partially polymerizing a monovinylaromatic compound with a polybutadiene rubber, and then completely polymerizing the resultant blend.

According to the present invention there is provided a process for the preparation of an interpolymer of a monovinylaromatic compound and a polybutadiene rubber, which comprises polymerizing a monovinylaromatic compound to a conversion of not greater than 45%, preferably to a conversion between 30 and 40%, by heating the monovinylaromatic compound at a temperature between 70 and 140° C., preferably between 90 and 120° C., and blending the resultant solution of the partially polymerized monovinylaromatic compound in the monovinylaromatic compound with a prepolymer to give a blend which comprises between 40 and 60% by weight of said prepolymer, and then completely polymerizing said blend by heating at a temperature between 100 and 220° C., preferably between 140 and 200° C.; said prepolymer is obtained by interpolymerizing to a conversion not greater than 10%, preferably to a conversion between 1 and 5%, an agitated mixture of a monovinylaromatic compound and a polybutadiene rubber. The present invention also includes the interpolymer prepared by the process just defined. By the term "completely polymerizing" used herein we mean that the monovinylaromatic compound is polymerized to a conversion of not less than 95%.

Examples of the monovinylaromatic compounds which can be used in carrying out the process of the present invention are styrene, substituted styrenes, for example, alpha-methyl styrene, nuclear alkylated styrenes, for example, vinyl toluene, and nuclear halogenated styrenes, for example, p-chlorostyrene. It will be appreciated that the monovinylaromatic compound can contain in its molecular structure nuclear-substituents which do not interfere with the course of the reaction.

The non-stereospecific polybutadiene rubber known under the trade designation "Plioflex 5000-S" is an example of a polybutadiene rubber which can be used in carrying out the process of the present invention. However, the preferred polybutadiene rubbers are stereoregular cis-polybutadiene rubbers with a cis-1,4 content of greater than 20%. Examples of such stereoregular cis-polybutadiene rubbers are rubbers with a medium cis-1,4 content, for example, the rubbers known under the trade designations "Diene 35" and "Diene 55 NF" which have cis-1,4 contents of about 40%, and rubbers with a high cis-1,4 content, for example, the polybutadiene rubber known under the trade designation "Taktene 1202" which has a cis-1,4 content greater than 90% and the polybutadiene rubber known under the trade designation "Cariflex BR" which has a cis-1,4 content of greater than 96%.

The interpolymer prepared by the process of the present invention can conveniently comprise between about 5 and about 10% by weight of polybutadiene rubber.

If desired, the blend of the solution of the partially polymerized monovinylaromatic compound in said monovinylaromatic compound with said prepolymer can also comprise a lubricant, for example, butyl stearate or a white oil. Particularly suitable white oils are those sold under the trade designation "Risella Oil," for example, the white oil known as "Risella 33" which has a viscosity at 100° F. in the range 64.7 to 80 centistokes. If desired, a mixture of lubricants can be used, for example, a mixture of butyl stearate and "Risella 33." In general, the amount of lubricant present in the interpolymer will not be greater than about 10% by weight and it can be conveniently from 2 to 7% by weight. Use of such lubricants is well known to persons skilled in the art to which this invention pertains.

The prepolymer used in preparing the interpolymer in accordance with the process of the present invention can be prepared by heating an agitated mixture of the monovinylaromatic compound and the polybutadiene rubber in the absence of a catalyst at a temperature between 70 and 140° C., preferably between 90 and 120° C., or by heating said mixture in the presence of a free radical-producing catalyst at a temperature between 60 and 100° C., the particular temperature chosen in the latter case depending on the decomposition temperature of the free radical-producing catalyst. Examples of suitable free radical-producing catalysts are acetyl peroxide, t-butyl perpivalate, t-butyl peroctoate, propionyl peroxide, 2,4-dichlorobenzoyl peroxide, p-methoxybenzoyl peroxide, octanoyl peroxide, benzoyl peroxide, lauroyl peroxide and azoisobisisobutyronitrile. The amount of free radical-producing catalyst used can conveniently be such that the monovinylaromatic compound polymerizes at a rate of from 2 to 10% per hour. For example, the amount of lauroyl peroxide used can conveniently be between 0.01 and 0.1% by weight of the combined weight of the mixture of the monovinylaromatic compound and the polybutadiene rubber. Heat transfer during the prepolymerization may be effected by agitation of the mixture of the monovinylaromatic compound and the polybutadiene rubber in a vessel containing indirect heat-transfer means, e.g., a jacket adapted for circulation of heating medium or coolant. During the prepolymerization the reaction temperature should preferably not vary by more than 10° C., more preferably it should not vary by more than 5° C. and most preferably it should not vary by more than 1° C.

The solution of the partially polymerized monovinylaromatic compound in said monovinylaromatic compound can be blended with said prepolymer at temperatures above 0° C., for example at temperatures between 100 and 120° C. either by stirring together or by pumping simultaneously said solution of the partially polymerized monovinylaromatic compound and said prepolymer through a homogenizer, for example, a centrifugal pump with wide clearance.

The present invention is illustrated by the following examples, in which a part by weight bears the same relationship to a part by volume as does the kilogram to the liter.

EXAMPLES

In these examples the monovinylaromatic compound used was styrene and the polybutadiene rubber used was a medium cis-1,4-polybutadiene rubber with a Mooney viscosity between 50 and 55 which is sold under the trade designated "Diene 55 NF."

The solution of the partially polymerized monovinylaromatic compound in the monovinylaromatic compound was prepared by heating styrene, which was stirred with a blade stirrer rotating at 260 r.p.m., at 105° C. in a reaction vessel which had been filled with nitrogen.

In Examples 1 and 2, which are included for comparative purposes only, 50 parts by volume of the solution of partially polymerized styrene was blended by stirring for 0.5 hour at 105° C. with a blade stirrer rotating at 260 r.p.m. with 50 parts by volume of a solution prepared by dissolving 10 parts by weight of "Diene 55 NF" in 90 parts by weight of styrene and 8 parts by weight of "Risella 33." The resultant blend was completely polymerized by heating the blend without further agitation for 22 hours at 180° C. The properties of resultant interpolymer are summarized in the table.

In Examples 3 to 8, 50 parts by volume of the solution of partially polymerized styrene was blended by stirring for 0.5 hour at 105° C., with a blade stirrer rotating at 260 r.p.m. with 50 parts by volume of a prepolymer prepared by interpolymerizing at 105° C. a solution which was stirred with a blade stirrer rotating at 260 r.p.m. and was prepared by dissolving 10 parts by weight of "Diene 55 NF" in 90 parts by weight of styrene and 8 parts by weight "Risella 33." The resultant blend was completely polymerized by heating the blend without further agitation for 22 hours at 180° C. The properties of the resultant interpolymer are summarized in the table.

It will be seen from the table that the falling weight impact strength of a styrene-butadiene interpolymer formed by the process of the present invention reaches its maximum value when the styrene-butadiene interpolymer is prepared from a prepolymer obtained by polymerizing a solution of the polybutadiene rubber in styrene to a conversion well below 11.7% (Example 8) prior to blending. The Izod impact strength decreased drastically between Examples 7 and 8, and the falling weight impact strength between Examples 6 and 7.

The gel content of the interpolymer and the swelling index of the gel were determined by weighing a sample of the interpolymer (about 0.5 gram) into a dry 50 milliliters volumetric flask. 20 milliliters of toluene were added and the stoppered flask was shaken overnight. The contents of the flask were transferred to a weighed stainless steel centrifuge tube using 15 milliliters of toluene to wash out the flask. The samples were centrifuged for 25 minutes at 15,000 r.p.m. The supernatant liquid was decanted, 20 milliliters of toluene were added and the tube was shaken for one hour. A further 15 milliliters of toluene were added and the sample was again centrifuged. The supernatant liquid was decanted and the swollen gel blown with air to remove any remaining toluene. The swollen gel and the centrifuge tube were weighed. The gel was then covered with toluene and the centrifuge tube was then shaken to redisperse the gel, which was then transferred to a weighed aluminum dish. The contents of the dish were evaporated to dryness on a steam bath and the dish was then placed in a vacuum oven at 110° C. and 30 inches mercury vacuum for 30 minutes. The dish was allowed to cool in a desiccator and then weighed. If the weight of sample taken is $S$ grams, the weight of swollen gel is $W$ grams and the weight of dried gel is $D$ grams, the gel content (percent by weight) is given by $100\ D/S$ and the swelling index of the gel is given by $W/D$.

| Example | Conversion, percent wt. | | | Blend Composition, parts by weight | | | Product Properties Before Milling | | |
|---|---|---|---|---|---|---|---|---|---|
| | Prepolymer | Partially polymerized styrene | Blend before polymerization | Styrene | Polybutadiene | White oil | Styrene monomer, percent wt. | Gel, percent wt. | Swelling index of gel |
| 1 | 0 | 33.5 | 18.7 | 95.4 | 4.6 | 3.7 | 0.49 | 13.2 | 8.9 |
| 2 | 0 | 37.5 | 23.9 | 95.6 | 4.4 | 3.5 | 0.23 | 14.8 | 7.7 |
| 3 | 1.0 | 20.9 | 12.6 | 95.1 | 4.9 | 3.9 | 1.14 | 15.5 | 9.1 |
| 4 | 2.7 | 36.7 | 21.9 | 95.2 | 4.8 | 3.8 | 0.52 | 13.1 | 7.4 |
| 5 | 2.9 | 29.4 | 17.2 | 94.2 | 5.1 | 4.1 | 0.66 | ND | ND |
| 6 | 4.2 | 42.3 | 26.3 | 94.9 | 5.1 | 4.1 | 0.24 | 13.4 | 6.2 |
| 7 | 8.9 | 30.5 | 21.8 | 95.3 | 4.7 | 3.8 | 0.40 | 12.5 | 7.4 |
| 8 | 11.7 | 36.0 | 28.5 | 95.8 | 4.2 | 3.4 | 0.20 | 9.9 | 6.4 |

See footnote at end of table.

| Example | Product Properties—Continued | | | | | | |
|---|---|---|---|---|---|---|---|
| | After Milling | | | | | | |
| | Gel, percent wt. | Swelling index of gel | Melt index, g./10 min | Relative solution, viscosity | Izod impact strength, ft. lb./in. notch | Falling weight impact strength,[1] ft. lb. | Rockwell Hardness R Scale |
| 1 | 13.9 | 8.5 | 10.2 | 1.78 | 1.00 | 0.59 | 105 |
| 2 | 14.0 | 8.9 | 10.0 | 1.82 | 1.10 | 0.54 | 106 |
| 3 | 15.3 | 9.4 | 8.3 | 1.77 | 1.10 | 0.97 | 103 |
| 4 | 13.1 | 7.1 | 6.6 | 1.86 | 1.00 | 0.80 | 106 |
| 5 | ND | ND | 7.7 | 1.80 | 0.96 | 1.14 | 105 |
| 6 | 13.7 | 6.4 | 7.1 | 1.91 | 0.88 | 1.24 | 107 |
| 7 | 12.3 | 7.3 | 8.9 | 1.88 | 0.90 | 0.70 | 107 |
| 8 | 10.2 | 6.9 | 6.7 | 2.2 | 0.45 | 0.23 | 107 |

[1] Determined on 0.060 in compression molded sheet.
ND = Not determined.

We claim as our invention:

1. A process for the preparation of an interpolymer of a monovinylaromatic compound and a polybutadiene rubber, which comprises polymerizing a monovinylaromatic compound to a conversion not greater than 45% by heating the monovinylaromatic compound at a temperature between 70 and 140° C. and blending the resultant solution of the partially polymerized monovinylaromatic compound in the monovinylaromatic compound with a prepolymer to give a blend which comprises between 40 and 60% by weight of said prepolymer, and then completely polymerizing said blend by heating at a temperature between 100 and 220° C., said prepolymer being obtained by interpolymerizing to a conversion not greater than 10% an agitated mixture of a monovinylaromatic compound and a polybutadiene rubber held at a temperature between 70 and 140° C.

2. A process as claimed in claim 1, wherein said monovinylaromatic compound is styrene.

3. A process as claimed in claim 2, wherein the monovinylaromatic compound is polymerized to a conversion between 30 and 40%.

4. A process as claimed in claim 2, wherein the monovinylaromatic compound is polymerized by heating at a temperature between 90 and 120° C.

5. A process as claimed in claim 2, wherein said blend is completely polymerized by heating at a temperature between 140 and 200° C.

6. A process as claimed in claim 2, wherein said prepolymer is obtained by interpolymerizing to a conversion between 1 and 5%.

7. A process as claimed in claim 1, wherein said agitated mixture is heated at a temperature between 90 and 120° C.

8. A process as claimed in claim 2, wherein said agitated mixture is heated in the presence of a free radical-producing catalyst at a temperature between 60 and 100° C.

References Cited

UNITED STATES PATENTS 3,144,420   8/1964   Fryling _____ 260—876 XR
3,330,786   7/1967   Finestone et al. __ 260—876 XR GEORGE F. LESMES, *Primary Examiner.*